United States Patent
Park et al.

(10) Patent No.: US 12,319,218 B2
(45) Date of Patent: Jun. 3, 2025

(54) AIR-GUARD HAVING SUB-GUIDE STRUCTURE

(71) Applicant: Hanon Systems, Daejeon (KR)

(72) Inventors: Sung-Wook Park, Daejeon (KR); Neung Kwon, Daejeon (KR); Ok Ryul Min, Daejeon (KR); Won Sub So, Daejeon (KR); Yong Min Jo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 304 days.

(21) Appl. No.: 17/960,948

(22) Filed: Oct. 6, 2022

(65) Prior Publication Data

US 2023/0112130 A1 Apr. 13, 2023

(30) Foreign Application Priority Data

Oct. 8, 2021 (KR) .................. 10-2021-0133668

(51) Int. Cl.
*B60R 19/52* (2006.01)
*B60K 11/08* (2006.01)

(52) U.S. Cl.
CPC .............. *B60R 19/52* (2013.01); *B60K 11/08* (2013.01); *B60R 2019/525* (2013.01)

(58) Field of Classification Search
CPC ... B60R 19/52; B60R 2019/525; B60K 11/08; F01P 11/10
See application file for complete search history.

(56) References Cited

U.S. PATENT DOCUMENTS 10,518,631 B2 * 12/2019 Park
10,794,261 B2 * 10/2020 Maeda .................. B60K 11/04

FOREIGN PATENT DOCUMENTS

| KR | 20170062885 A | * | 6/2017 |
| KR | 101756002 | | 7/2017 |
| KR | 101756002 B1 | * | 7/2017 |
| KR | 102017463 B1 | | 9/2019 |

OTHER PUBLICATIONS

Excerpts from online news regarding Huindai Motors launched "Avante N", (2021), https://www.ebn.co.kr/news/view/1491710/?sc=Naver, pp. 1-8, with English translation.
Official Action issued Jan. 2, 2025 in related Korean Patent Application No. 10-2021-0133668, 4 pgs.

* cited by examiner

*Primary Examiner* — James A Shriver, II
*Assistant Examiner* — Nicholas R. Kandas
(74) *Attorney, Agent, or Firm* — NORTON ROSE FULBRIGHT US LLP

(57) ABSTRACT

Provided is an air-guard having a sub-guide structure, that is, an air-guard having a sub-guide structure for improving availability of air introduced into a vehicle grill. In particular, an air-guard having a sub-guide structure includes an improved structure for guiding air toward a suction duct at an upper end portion of the air-guard or an inside of the air-guard, thereby efficiently utilizing non-used air between the air-guard and a duct mounting portion.

15 Claims, 7 Drawing Sheets

AIR-GUARD HAVING SUB-GUIDE STRUCTURE

CROSS-REFERENCE TO RELATED APPLICATIONS

This application claims priority under 35 U.S.C. § 119 to Korean Patent Application No. 10-2021-0133668 filed on Oct. 8, 2021, in the Korean Intellectual Property Office, the disclosure of which is incorporated herein by reference in its entirety.

TECHNICAL FIELD

The following disclosure relates to an air-guard having a sub-guide structure, and in particular, to an air-guard having a sub-guide structure, which improves availability of air flowing into a vehicle grille by improving a structure of the air-guard for guiding a traveling wind to a cooling module.

BACKGROUND

In general, an engine room of a vehicle is provided with various heat exchangers for cooling each component in the vehicle, such as an engine or adjusting an air temperature in the vehicle, as well as parts for driving the engine. In order for the various heat exchangers in the vehicle engine room to operate stably, it is natural that external air should be smoothly supplied into the engine room. As such, in order to smoothly supply external air to the heat exchangers in the vehicle engine room, a grille having a plurality of holes is generally provided at the front of the vehicle. That is, a traveling wind introduced through the grille when the vehicle is driven passes through a cooling module including the heat exchangers, thereby enabling smooth heat exchange.

Meanwhile, in order to make a vehicle manufacturing process efficient, in general, parts placed close to each other in the engine room may be modularized and separately manufactured, so that a vehicle may be assembled through a single process using such modules during an inline assembly process. The cooling module mentioned above is also a part obtained by modularizing a heat exchanger, a fan, etc., and a front-end module mounted on the front of the vehicle is a part obtained by integrating a bumper beam, a headlamp, a hood latch, a horn, and the aforementioned cooling module on a carrier.

A large opening is provided in the center of the front-end module to allow traveling wind to pass therethrough, and a cooling module is provided therein, so that smooth heat exchange may be achieved by using traveling wind in the cooling module. In order to effectively concentrate traveling wind on the cooling module and to prevent a backflow of heat generated by the engine, an air-guard is generally provided on the carrier of the front-end module. Korean Patent Registration No. 2017463 ("Air-guard unit for vehicle and manufacturing method thereof", Aug. 28, 2019, referred to as "related art document" hereinafter), etc. discloses a front-end module including such an air-guard.

FIG. 1 shows an exemplary embodiment of a front-end module of a related art. As described above, in a front-end module 1, a cooling module is generally operated by traveling wind introduced through an opening provided in the center of a carrier 2. At this time, as described in the related art, an air-guard 3 is provided around the opening so that traveling wind may be effectively concentrated on the cooling module. Meanwhile, traveling wind is not only used by the cooling module, but a portion of traveling wind may be introduced through a separate suction duct and used for other purposes. An upper end of the carrier 2 is provided with a duct mounting portion 4 connected to the suction duct, and the duct mounting portion 4 has a through-hole as shown (omitted in FIG. 1, though), so that a portion of traveling wind may be introduced through the suction duct mounted at the rear.

FIG. 2 shows a schematic diagram of an air flow in the front-end module of the related art. As described above, most of traveling wind introduced into the grille is guided to the air-guard 3 and flows toward the cooling module 5, and a portion of traveling wind is guided to the duct mounting portion 4 at an upper end of the carrier 2 and flows to the suction duct 6. Here, as can be seen with reference to FIG. 1, an appropriate thickness is formed between the air-guard 3 and the duct mounting portion 4 to maintain structural rigidity of the carrier 2, and this portion acts as an obstacle to block movement of traveling wind. That is, traveling wind flowing into the position between the air-guard 3 and the duct mounting portion 4 becomes non-used air that is not used but discarded.

Traveling wind is a very important resource that may be obtained in an air-conditioning system of vehicles, and therefore, it is necessary to prevent such air loss and maximize air use efficiency.

RELATED ART DOCUMENT

Patent Document (Patent document 1) 1. Korean Patent Registration No. 2017463 ("Air-guard unit for vehicle and manufacturing method thereof", Aug. 28, 2019)

SUMMARY

An exemplary embodiment of the present invention is directed to providing an air-guard having a sub-guide structure for improving availability of air introduced into a vehicle grill, and particularly, an air-guard having a sub-guide structure, including an improved structure for guiding air toward a suction duct at an upper end portion of the air-guard or an inside of the air-guard, thereby efficiently utilizing non-used air between the air-guard and a duct mounting portion.

In one general aspect, an air-guard 150 mounted on a carrier 110 of a front-end module 100, wherein the carrier 110 includes an opening 115 through which traveling wind flows to a cooling module mounted on a rear side and includes a duct mounting portion 120 having an inlet 125 allowing a portion of traveling wind to be introduced into a suction duct, wherein the air-guard 150 includes a sub-guide structure mounted on a front surface of the opening 115 to guide air introduced to a region between the opening 115 and the inlet 125 toward the cooling module or the suction duct so that traveling wind is concentrated on the cooling module.

At this time, the air-guard 150 may be provided in a form including an upper cover and left and right side covers.

In addition, the sub-guide structure may be provided at an upper end of the air-guard 150.

Specifically, the sub-guide structure may include: a guide rib 151 having a planar shape extending in a front-rear direction at the upper end portion of the air-guard 150 to guide air to the guide duct 152.

In addition, the sub-guide structure may include a guide duct 152 provided to correspond to the inlet 125 at the upper end portion of the air-guard 150 to guide air to the suction duct.

At this time, the guide duct 152 may include: an outer portion 152a corresponding to a shape of a front of the duct mounting portion 120 and a partition portion 152b provided on an inner side of the outer portion 152a so that a cross-sectional shape of the outer portion 152a corresponds to a shape of the inlet 125.

In addition, the inlet 125 may be in the form of a long hole elongated in a left-right direction and include at least one partition rib 121 dividing an elongated space into a plurality of sections and a reinforcing rib 122 configured to have an X-shape to support upper and lower ends, and the partition portion 152b may be provided in a position corresponding to the partition rib 121.

In addition, one end of the guide rib 151 may be connected to the guide duct 152, and may be connected to a portion of an upper end of the air-guard 150.

In addition, the guide duct 152 may extend outwardly from the center of the air-guard 150 from the front to the rear.

In addition, the guide rib 151 may be provided so that a plane formed by the guide rib 151 is perpendicular to an inflow direction of traveling wind and a width direction of the air-guard 150.

In addition, in the air-guard 150, the duct mounting portion 120 may be provided on at least one selected from among left and right sides on the carrier 110, and the guide rib 141 may be provided on an outermost side in a direction in which the duct mounting portion 120 is lopsided on the guide duct 152.

In addition, the sub-guide structure may include a plurality of guide through-holes 153 provided in a through-hole on an upper cover of the air guide 150 to guide air to the opening 115 inside the air-guard 150.

In addition, the guide through-hole 153 may be provided in the center of an upper cover of the air-guard 150.

In addition, a length of a region in a left-right direction in which the guide through-hole 153 is provided may be within a range of ¼ to ½ of a length of the upper cover of the air-guard 150 in the left-right direction.

In addition, the guide through-hole 153 may be in the form of a long hole formed to be longer in an inflow direction of traveling wind.

Effects of the Invention

According to the present invention, there is an effect of solving the problem of the related art in which traveling air flowing to a space between the air-guard and the duct mounting portion is blocked by a wall surface and thus not used and wasted as non-used air. Specifically, according to the present invention, a portion of non-used air is guided toward a suction duct using a guide duct and a guide rib provided at an upper end portion of the air-guard, or a portion of non-used air is introduced into the air-guard using a guide through-hole provided at the upper end portion of the air-guard. Accordingly, the non-used air itself may be removed as much as possible, and ultimately, there is an effect of maximizing air use efficiency of traveling wind.

Other features and aspects will be apparent from the following detailed description, the drawings, and the claims.

DETAILED DESCRIPTION OF EXEMPLARY EMBODIMENTS

Hereinafter, an air-guard having a sub-guide structure according to the present invention having the configuration as described above will be described in detail with reference to the accompanying drawings.

Figure 3:
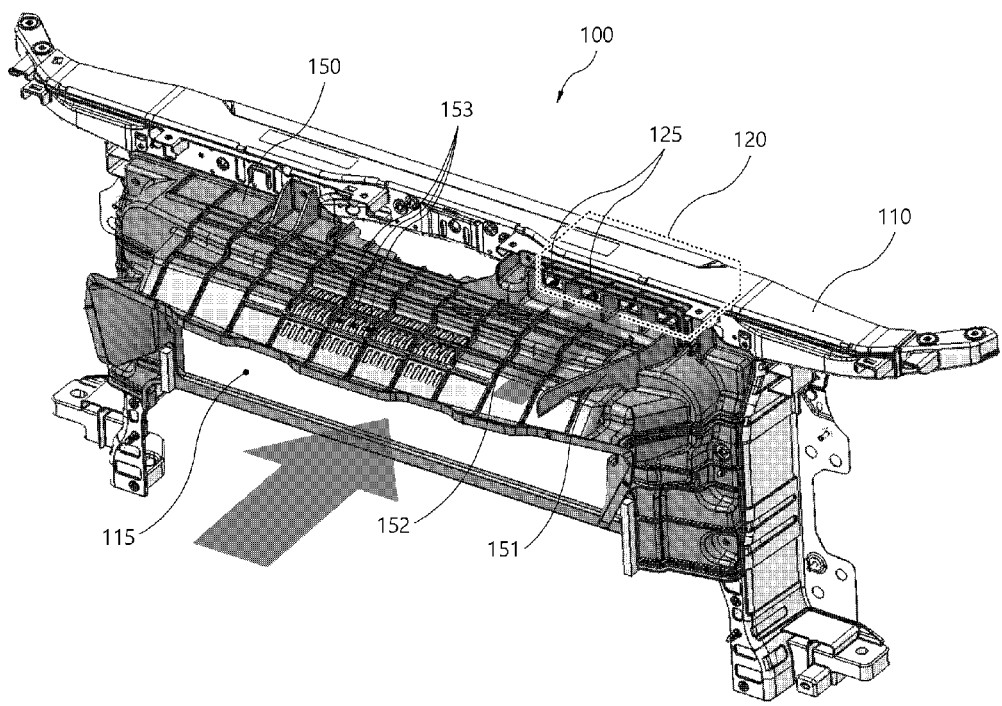
FIG. 3 is an exemplary embodiment of a front-end module equipped with an air-guard of the present invention.

FIG. 3 shows an exemplary embodiment of a front-end module equipped with an air-guard of the present invention. An air-guard 150 of the present invention is mounted on a carrier 110 of a front-end module 100 and serves to concentrate traveling wind, like a general air-guard. More specifically, first, the carrier 110 is configured such that most of traveling wind is concentrated on and distributed to a cooling module, but a portion of traveling wind is introduced into a suction duct. That is, the carrier 110 includes an opening 115 for distributing traveling wind to the cooling module mounted on the rear side and includes a duct mounting portion 120 having an inlet 125 allowing a portion of traveling wind to be introduced into the suction duct therethrough. At this time, the air-guard 150 is mounted on a front surface of the opening 115 to concentrate traveling wind on the cooling module. The air-guard 150 generally has a shape including an upper cover and left and right side covers as shown.

As described above, a region between the opening 115 and the inlet 125 is in the form of a wall blocking an air flow, and in the related art, traveling wind flowing into the region is not used for resources of an air-conditioning system or for direct cooling of an engine room, becoming non-used air to be lost. However, in the present invention, a sub-guide structure for guiding the non-used air toward the cooling module or the suction duct is provided to prevent loss of non-used air and allow the air to be used for a resource of the air-conditioning system or for direct cooling of the engine room. Considering a location where the non-used air is generated, the sub-guide structure is preferably provided at an upper end portion of the air-guard 150. As shown in FIG. 3, the sub-guide structure provided on the air-guard 150 in the present invention may be largely a guide rib 151, a guide duct 152, a guide through-hole 153, and the like, and only some selected among them may be formed, but it is preferable that all of them are formed in order to maximize utilization of non-used air.

Figure 1:
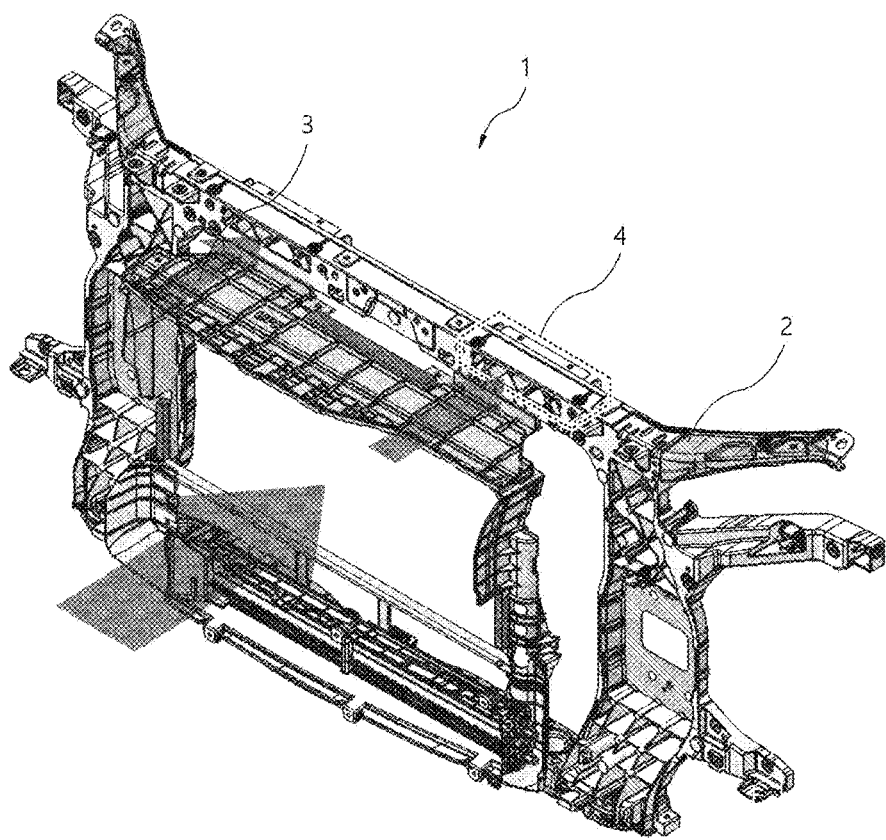
FIG. 1 is an exemplary embodiment of a front-end module of the related art.
Figure 2:
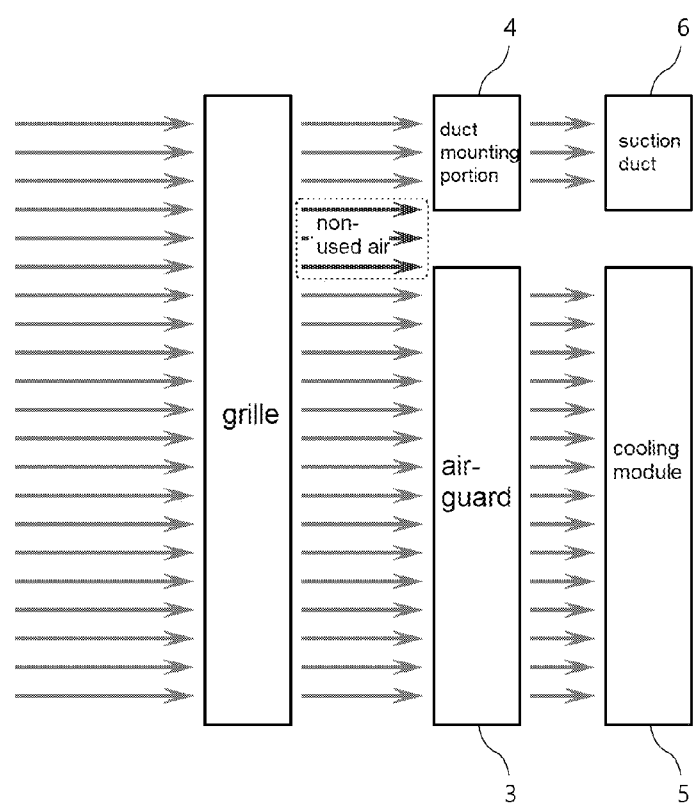
FIG. 2 is a schematic diagram of an air flow of the front-end module of the related art.
Figure 4:
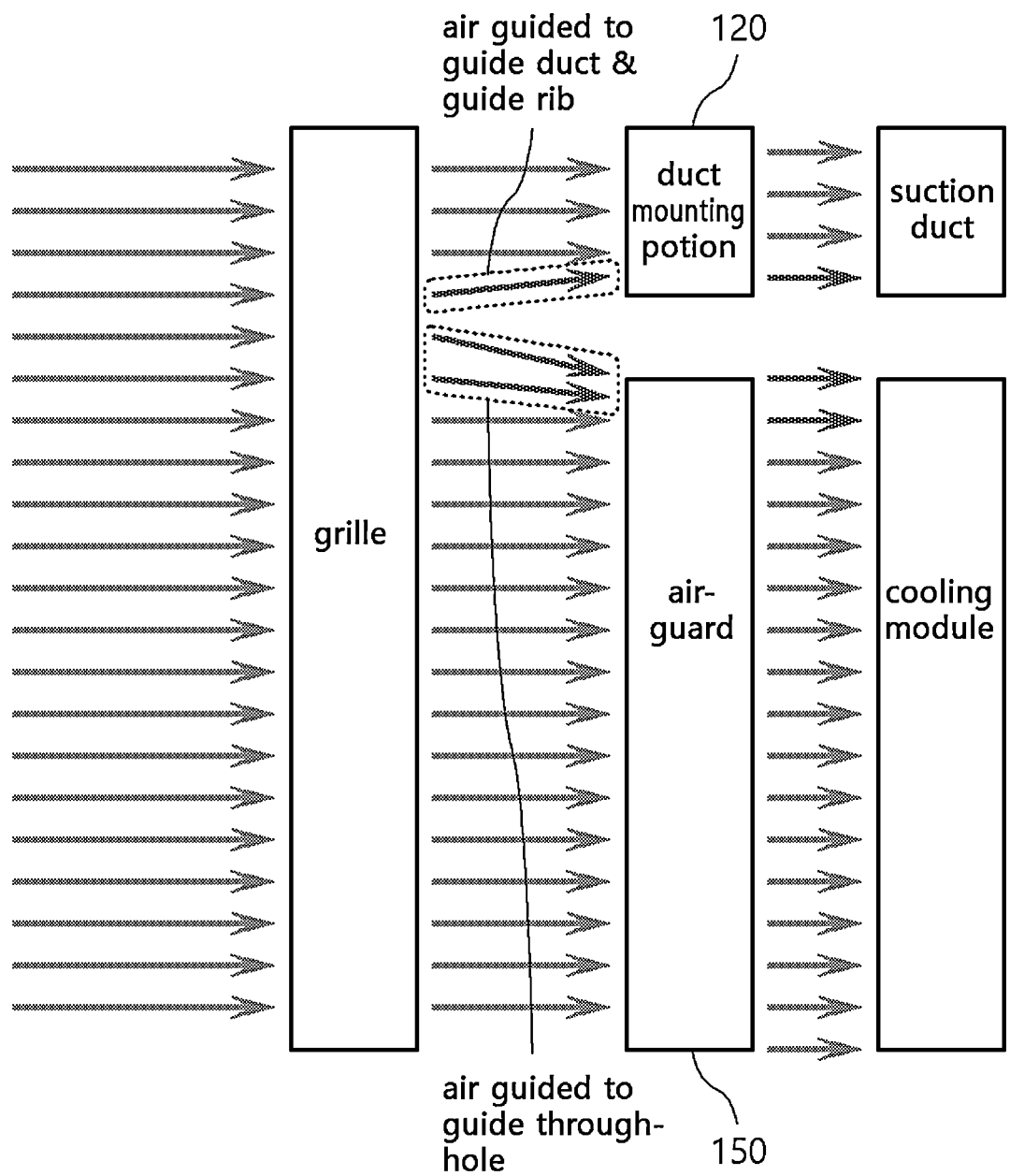
FIG. 4 is a schematic view of an air flow of a front-end module equipped with an air-guard of the present invention.

FIG. 4 shows a schematic diagram of an air flow of a front-end module equipped with an air-guard of the present invention. Compared with FIG. 2, it can be clearly seen intuitively that, in the present invention, the air flow, which is indicated as [non-used air] in FIG. 2 according to the related art, is guided toward the suction duct (through the duct mounting portion) or (introduced to the inner side of the air-guard) and guided toward the cooling module as shown in FIG. 4, so that both flow rates of the suction duct airflow and the cooling module airflow are increased. When the non-used air is guided toward the cooling module, resources of the air-conditioning system may be expanded to improve air-conditioning performance, and when the non-used air is guided toward the suction duct, it is natural that the performance related to the suction duct, such as direct cooling of an engine room, may also be improved. That is, air use efficiency may be maximized by preventing loss of traveling wind as much as possible by using the sub-guide structure of the present invention.

Hereinafter, each of the sub-guide structures, that is, the guide rib 151, the guide duct 152, and the guide through-hole 153 will be described in more detail.

Among the sub-guide structures, the guide rib 151 and the guide duct 152 serve to guide the non-used air toward the suction duct.

Figure 5:
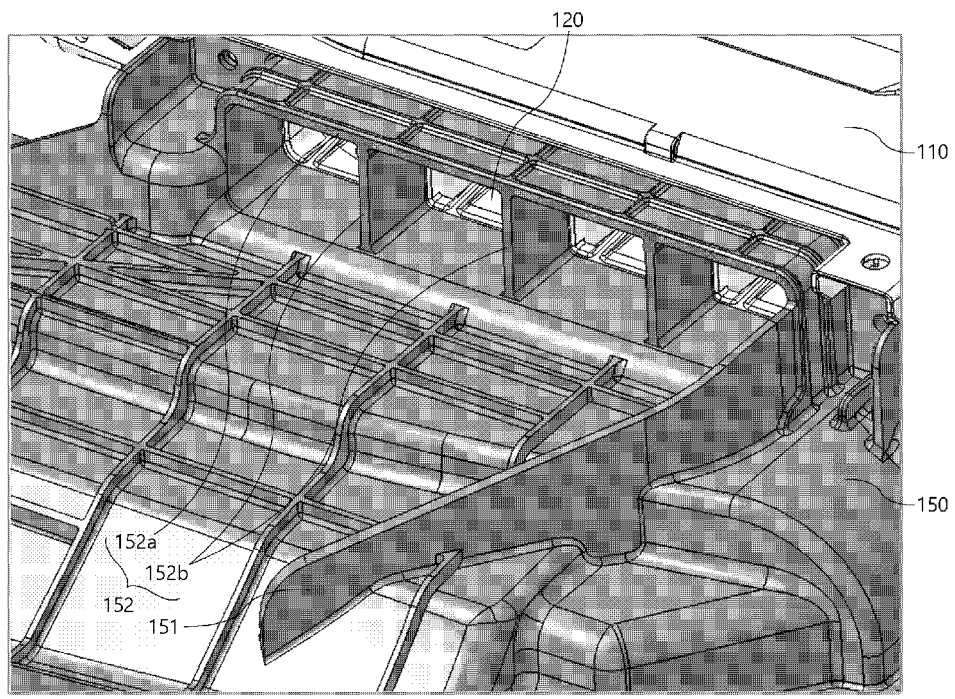
FIG. 5 is a partially enlarged view of a front-end module equipped with an air-guard of the present invention.
Figure 6:
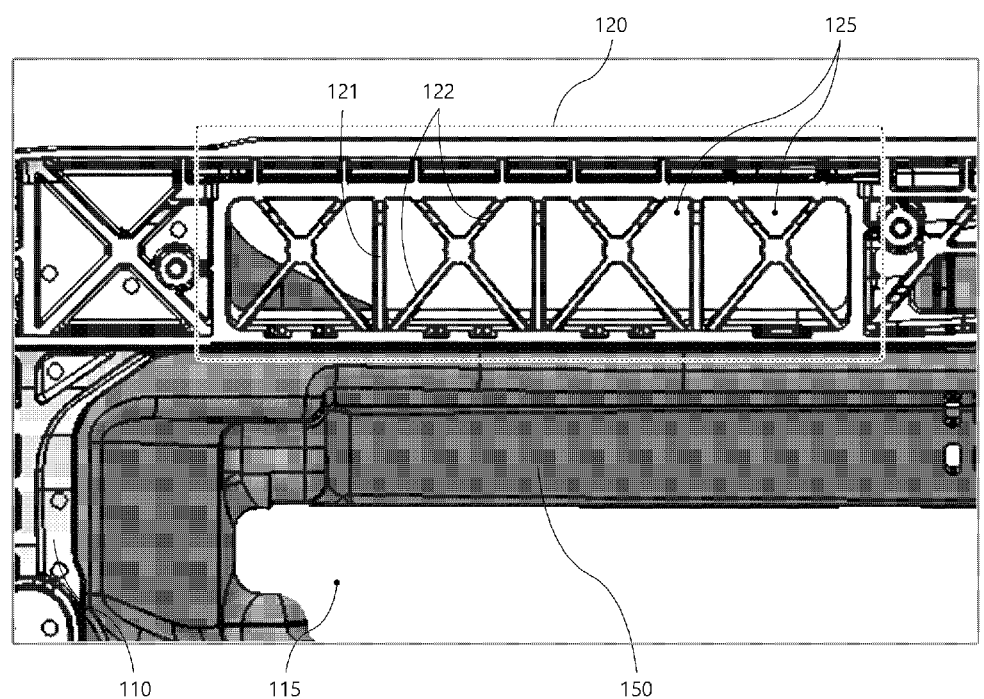
FIG. 6 is a partial rear view of a front-end module equipped with an air-guard of the present invention.

First, the guide duct 152 will be described as follows. The guide duct 152 is provided to correspond to the inlet 125 at the upper end of the air-guard 150 and serves to guide non-used air to the suction duct. FIG. 5 is a partially enlarged view of a front-end module equipped with an air-guard of the present invention, and FIG. 6 is a partial rear view of the same portion as that of FIG. 5, in which the duct mounting portion 120 is enlarged. The duct mounting portion 120 is provided at an upper end of the carrier 110 and includes a coupling structure so that the suction duct may be mounted on a rear side, and of course, the inlet 125 is provided to allow air to be introduced into the suction duct therethrough. The guide duct 152, as shown in FIG. 5, may be provided in the form of a duct that is in close contact with the front surface of the inlet 125 so that air may be more easily concentrated and guided into the inlet 125.

Referring to the rear view of FIG. 6, the shape of the inlet 125 is shown clearly, and it can be seen that the inlet 125 is separated from the opening 115 (which allows air to flow toward the cooling module) at a predetermined distance in an up-down direction. In other words, in terms of the structure of the carrier 110 alone, as can be seen from FIG. 6, a vertical distance between the inlet 125 and the opening 115 is not large enough to be a problem. Meanwhile, a rear cross-sectional area of the air-guard 150 is substantially the same as an area of the opening 115, and the area of the opening 115 corresponds to an area of the cooling module (a heat exchanger included in the cooling module). Meanwhile, a front cross-sectional area of the air-guard 150 approximately corresponds to an area of the grille through which traveling wind is first introduced. That is, the front of the air-guard 150 corresponds to the grille, and the rear of the air-guard 150 corresponds to the cooling module heat exchanger, as is well known, the grille is significantly narrow vertically, while the cooling module heat exchanger is approximately relatively equal vertically and horizontally, compared with the grille. As a result, the air-guard 150 is inevitably widened vertically from the front to the rear, that is, the upper cover of the air-guard 150 is inevitably increased from the front to the rear. Accordingly, as can be seen from the rear view of FIG. 6, there is a gap in the up-down direction between the open portion of the opening 150 and the inlet 125 due to the upper cover portion of the air-guard 150.

At this time, most of traveling wind introduced under the upper cover, that is, inner side of the air-guard 150, may easily flow toward the cooling module and be properly utilized. Meanwhile, a portion of traveling wind introduced above the upper cover, that is, above the air-guard 150, needs to be introduced into the suction duct through the inlet 125 to be properly utilized. However, unlike the opening 115, the inlet 125 is not provided over the entire upper end portion of the carrier 110, but is mostly provided over a portion. Therefore, air flowing directly into the inlet 125 may be introduced easily, but air flowing into a region outside the inlet 125 position may not flow into the inlet 125 but may be scattered, which becomes non-used air.

However, as shown in FIG. 5, when the guide duct 152 is provided to protrude from a front surface of the inlet 125, the air flow, which may be scattered, may be concentrated on the inlet 125 to some extent. As such, it is preferable that the guide duct 152 is provided to concentrate and guide the air flow to the inlet 125. More specifically, the guide duct 152 may include an outer portion 152a corresponding to a shape of the front of the duct mounting portion 120. In addition, the guide duct 152 may further include a partition portion 152b provided on an inner side of the outer portion 152a so that a cross-sectional shape of the outer portion 152a corresponds to the shape of the inlet 125. The partition portion 152b may not only serve to intensively guide air, but may also serve to strengthen structural rigidity of the outer portion 152a. In addition, the guide duct 152 is provided to extend outwardly from the center of the air-guard 150 in a direction from the front to the rear to correspond to the position of the inlet 125.

In addition, the shape of the inlet 125 and the guide duct 152 will be described in more detail as follows. As shown, the inlet 125 has a long hole shape extending in the left-right direction, and may have a structure capable of obtaining structural stability without interfering with air flow. To this end, the inlet 125 may include at least one partition rib 121 partitioning an elongated space into a plurality of spaces and a reinforcing rib 122 having an X-shape to support upper and lower ends. In this case, the partition portion 152b of the guide duct 152 is preferably provided at a position corresponding to the partition rib 121.

Meanwhile, the guide rib 151 will be described as follows. Although it is possible to concentrate and guide non-used air to some extent only with the guide duct 152, an air flow that flows toward the guide duct 152 and then exits outside may occur. The guide rib 151 serves to catch the air flow, that is, has a flat shape extending in the front-rear direction at the upper end portion of the air-guard 150 to guide non-used air to the guide duct 152. More specifically, the plane formed by the guide rib 151 may be perpendicular to an inflow direction of traveling wind and a width direction of the air-guard 150. As shown in FIG. 5, one end of the guide rib 151 is completely connected to the guide duct 152 and is connected to a portion of the upper end of the air-guard 150, thereby effectively preventing non-used air from leaking out in the vicinity of the guide duct 152.

In particular, the effect of the guide rib 151 may be significantly improved depending on a position of the guide duct 152. As shown in FIG. 3, the duct mounting portion 120 may be provided on at least one side selected from left and right on the carrier 110. At this time, as shown in FIG. 5, the guide rib 151 is provided at the outermost side in a direction in which the duct mounting portion 120 is lopsided on the guide duct 152, thereby effectively collecting the air flow that may be leaked to the outside of the air-guard 150 in the left-right direction and concentratively guiding the air flow to the guide duct 152.

Figure 7:
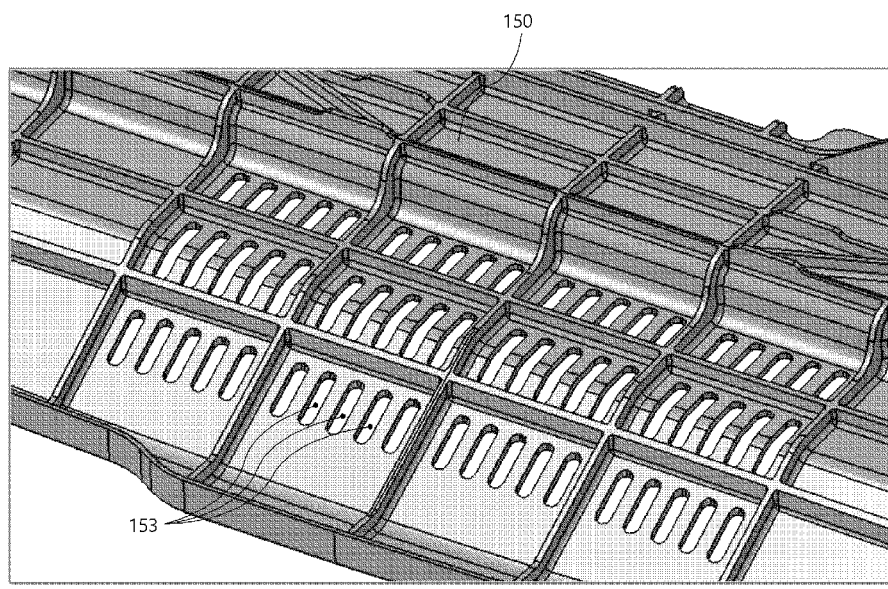
FIG. 7 is another partially enlarged view of a front-end module equipped with an air-guard of the present invention.

Among the sub-guide structures, the guide through-hole 153 serves to guide non-used air toward the cooling module. FIG. 7 is another partially enlarged view of a front-end module equipped with an air-guard of the present invention. As shown in FIG. 7, the guide through-hole 153 has a shape of a through-hole on the upper cover of the air-guard 150 to guide non-used air to the opening 115 inside the air-guard

150. At this time, since the direction of the air flow is in the front-rear direction, the guide through-hole 153 is preferably in the form of a long hole longer in the inflow direction of traveling wind so that air may be smoothly introduced. In addition, a plurality of the guide through-holes 153 may be randomly arranged, but in order to prevent an increase in loss of traveling wind due to the occurrence of unnecessary vortices, a plurality of the guide through-holes 153 may be regularly arranged in rows and columns.

In addition, the guide through-hole 153 may be formed in the center of the upper cover of the air-guard 150. In general, it is natural that a flow rate and intensity of traveling wind introduced through the grille are greatest at the center, and therefore, non-used air may be more effectively introduced when the guide through-hole 153 is provided to be closer to the center of the air-guard 150.

Meanwhile, if a region in which the guide through-hole 153 is formed is too large, structural stability of the upper cover of the air-guard 150 may be significantly deteriorated, and as the region is lopsided to the left and right sides, rather than centered, the non-used air introduction effect may also be deteriorated. In consideration of this, it is preferable that a length of the region in the left-right direction in which the guide through-hole 153 is provided may be within a range of ¼ to ½ of a length of the upper cover of the air-guard 150 in the left-right direction.

The present invention is not limited to the exemplary embodiments described above has a variety of application ranges, and it would be appreciated by those skilled in the art that changes may be made in the aspects without departing from the principles and spirit of the invention, the scope of which is defined in the claims and their equivalents.

[Detailed Description of Main Elements]

100: front-end module
110: carrier
115: opening
120: duct mounting portion
121: partition rib
122: reinforcing rib
125: inlet
150: air-guard
151: guide rib
151a: outer portion
151b: partition portion
152: guide duct
153: guide through-hole

What is claimed is:

1. An air-guard mounted on a carrier of a front-end module,
   wherein the carrier includes an opening through which traveling wind flows to a cooling module mounted on a rear side and includes a duct mounting portion having an inlet allowing a portion of traveling wind to be introduced into a suction duct,
   wherein the air-guard is mounted on a front surface of the opening so that traveling wind is concentrated on the cooling module,
   wherein the traveling wind, when introduced into a grille is divided into an upper-flow and a lower-flow, and the upper-flow flows through the duct mounting portion to the suction duct, and the lower-flow flows through the opening to the cooling module,
   wherein the air-guard includes a sub-guide structure configured to guide air introduced to a region between the opening and the inlet to the cooling module or the suction duct to prevent a loss of air introduced to the region.

2. The air-guard of claim 1, wherein the air-guard is formed in a form including an upper cover and left and right side covers.

3. The air-guard of claim 1, wherein the sub-guide structure is provided at an upper end of the air-guard.

4. The air-guard of claim 1, wherein the sub-guide structure includes a guide rib formed in a planar shape extending in a front-rear direction at the upper end portion of the air-guard to guide air to the guide duct.

5. The air-guard of claim 4, wherein the sub-guide structure includes a guide duct formed to correspond to the inlet at the upper end portion of the air-guard to guide air to the suction duct.

6. The air-guard of claim 5, wherein the guide duct includes an outer portion corresponding to a shape of a front of the duct mounting portion and a partition portion formed on an inner side of the outer portion so that a cross-sectional shape of the outer portion corresponds to a shape of the inlet.

7. The air-guard of claim 6, wherein the inlet is in the form of an elongated space elongated in a left-right direction and includes at least one partition rib dividing the elongated space into a plurality of sections and a reinforcing rib formed in an X-shape to support upper and lower ends, and the partition portion is provided at a position corresponding to the partition rib.

8. The air-guard of claim 5, wherein one end of the guide rib is connected to the guide duct, and is connected to a portion of an upper end of the air-guard.

9. The air-guard of claim 8, wherein the guide duct extends outwardly from the center of the air-guard from the front to the rear.

10. The air-guard of claim 8, wherein the guide rib is provided so that a plane formed by the guide rib is perpendicular to an inflow direction of traveling wind and a width direction of the air-guard.

11. The air-guard of claim 5, wherein the carrier has a left side and a right side, and the duct mounting portion is provided on the left or the right side of the carrier, and the guide rib is provided on an outermost edge of the side in relation to the carrier.

12. The air-guard of claim 2, wherein the sub-guide structure includes a plurality of guide through-holes on an upper cover of the air guide to guide air to the opening inside the air-guard.

13. The air-guard of claim 12, wherein the guide through-hole is provided in the center of an upper cover of the air-guard.

14. The air-guard of claim 12, wherein a length of a region in a left-right direction in which the guide through-hole is provided is within a range of ¼ to ½ of a length of the upper cover of the air-guard in the left-right direction.

15. The air-guard of claim 12, wherein the guide through-hole has a shape of a long hole longer in an inflow direction of traveling wind.

* * * * *